US008457071B2

(12) United States Patent
Alex et al.

(10) Patent No.: US 8,457,071 B2
(45) Date of Patent: Jun. 4, 2013

(54) REDUCING LATENCY AND PACKET LOSS RELATED TO HANDOFFS OF MOBILE VIDEO TRAFFIC

(75) Inventors: Arun Alex, Nashua, NH (US); Rajesh Velandy, Nashua, NH (US); Rajesh Ramankutty, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 465 days.

(21) Appl. No.: 12/872,463

(22) Filed: Aug. 31, 2010

(65) Prior Publication Data

US 2012/0051275 A1 Mar. 1, 2012

(51) Int. Cl.
*H04W 4/00* (2009.01)
(52) U.S. Cl.
USPC .......................................... 370/331; 455/436
(58) Field of Classification Search
None
See application file for complete search history.

(56) References Cited

U.S. PATENT DOCUMENTS

| 6,959,190 | B2 | 10/2005 | Choi et al. |
| 6,985,464 | B2 | 1/2006 | Harper et al. |
| 7,372,826 | B2 | 5/2008 | Dahod et al. |
| 2003/0053429 | A1 | 3/2003 | Choi et al. |
| 2003/0054823 | A1 | 3/2003 | Choi et al. |
| 2004/0013116 | A1 | 1/2004 | Greis et al. |
| 2005/0025132 | A1 | 2/2005 | Harper et al. |
| 2007/0189255 | A1 | 8/2007 | Navali et al. |
| 2008/0205342 | A1 | 8/2008 | Radhakrishnan et al. |
| 2009/0086742 | A1 | 4/2009 | Ghai et al. |
| 2009/0156213 | A1 | 6/2009 | Spinelli et al. |
| 2009/0319845 | A1* | 12/2009 | Liu et al. .................. 714/747 |
| 2010/0279670 | A1 | 11/2010 | Ghai et al. |

FOREIGN PATENT DOCUMENTS

| CN | 1596023 A | 3/2005 |
| EP | 2040436 A1 * | 3/2009 |
| WO | WO-2010081146 A2 | 7/2010 |

OTHER PUBLICATIONS

"Context Transfer, Handoff Candidate Discovery, and Dormant Mode Alerting (seamoby)." http://www.ietf.org/proceedings/54/217.htm—Apr. 8, 2002. 3 pages.

Kempf, J. "Problem Description: Reasons for Performing Context Transfers Between Nodes in an IP Access Network." Context and Micro-mobility Routing Working Group. Internet Draft, draft-ietf-seamoby-context-transfer-problem-stat-04.txt—Nov. 2001. 13 pages.

Kempf, J. "Problem Description: Reasons for Performing Context Transfers Between Nodes in an IP Access Network." Network Working Group. Sep. 2002. 13 pages.

(Continued)

*Primary Examiner* — Jianye Wu
(74) *Attorney, Agent, or Firm* — Wilmer Cutler Pickering Hale and Dorr LLP

(57) ABSTRACT

In one embodiment, a system including a memory capable of storing data and a processor is disclosed. The processor is configured for using the data such that the system can request from a source gateway subscription information related to a plurality of multicast video streams subscribed by the source gateway upon receiving a handoff request from a mobile device transitioning from a source region to a target region, wherein the handoff request contains information related to the source gateway. The processor is further configured for using the data such that the system can subscribe to at least a subset of the plurality of multicast video streams before the requested handoff is complete.

20 Claims, 5 Drawing Sheets

OTHER PUBLICATIONS

Loughney, J. et al. "Context Transfer Protocol." Seamoby WG, Internet Draft, Category: Experimental <draft-ietf-seamoby-ctp-11.txt>—Aug. 2004. 33 pages.

Syed et al. "General Requirements for Context Transfer." Internet Engineering Task Force, Internet Draft, draft-ietf-seamoby-ct-reqs-03.txt—Jan. 2002. 9 pages.

* cited by examiner

REDUCING LATENCY AND PACKET LOSS RELATED TO HANDOFFS OF MOBILE VIDEO TRAFFIC

FIELD OF THE DISCLOSURE

The present disclosure relates generally to reducing data path setup latencies and data packet loss related to handoff of mobile video traffic.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area. The first generation of wireless telephone technology used analog mobile phones in which analog information signals were transmitted. As technology progressed a second generation (2G) of wireless service was introduced. In 2G systems, digital information signals were used to modulate a carrier. Such networks that were upgraded to handle higher-speed packet data in networks referred to as 2.5G and 3G networks. The next evolution is 4G technology, which is referred to as long term evolution-system architecture evolution (LTE-SAE) and uses orthogonal frequency division multiple access (OFDMA) technology.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

OVERVIEW

This disclosure relates to systems, methods, and logic encoded in one or more tangible media for reducing latency and packet loss caused due to handoffs of mobile video traffic. In one embodiment, a system including a memory capable of storing data and a processor is disclosed. The processor is configured for using the data such that the system can request from a source gateway subscription information related to a plurality of multicast video streams subscribed by the source gateway upon receiving a handoff request from a mobile device transitioning from a source region to a target region, wherein the handoff request contains information related to the source gateway. The processor is further configured for using the data such that the system can subscribe to at least a subset of the plurality of multicast video streams before the requested handoff is complete.

DESCRIPTION OF EXAMPLE EMBODIMENTS

Systems, methods, and logic encoded in tangible media are disclosed for reducing data path setup latency and data packet loss caused due to handoffs of mobile video traffic. The data path setup latency and data packet loss are reduced or eliminated altogether by preemptively subscribing to, receiving, and caching multicast video streams that are predicted to be necessary to serve mobile devices requesting handoffs upon receiving handoff request(s). A target gateway, upon receiving a handoff request, requests subscription information from a source gateway identified in the request. The target gateway then determines to subscribe to some or all of the multicast video streams to which the source gateway subscribes based on the subscription information and the processing capacity of the target gateway.

Figure 1:
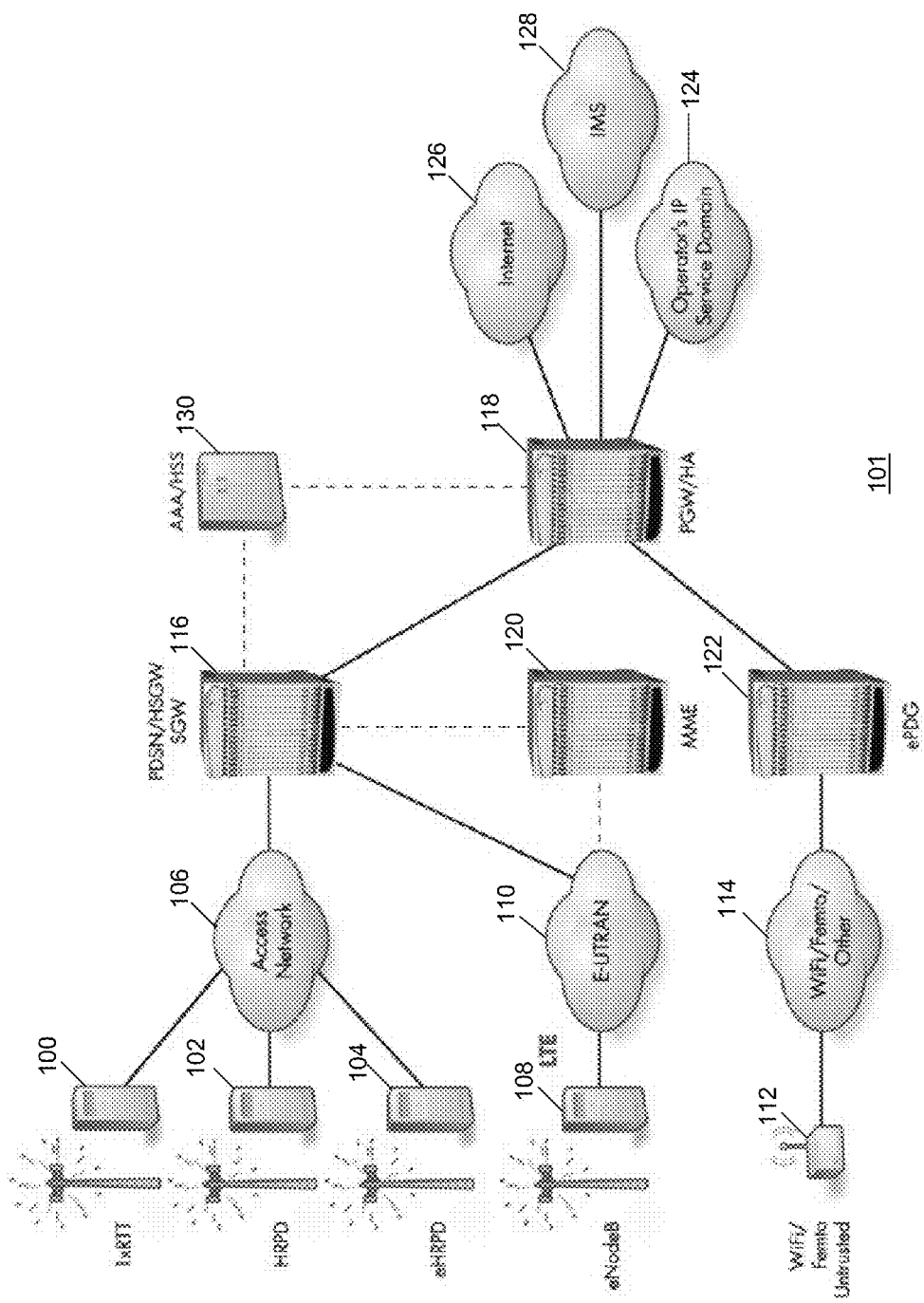
FIGS. 1-2 illustrate communication networks including a long term evolution (LTE) topology in accordance with some embodiments.

FIG. 1 illustrates a communication network 101 that includes systems, methods, and logic encoded in tangible media for reducing latency and packet loss caused due to handoffs of mobile video traffic in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/ home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attachment and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
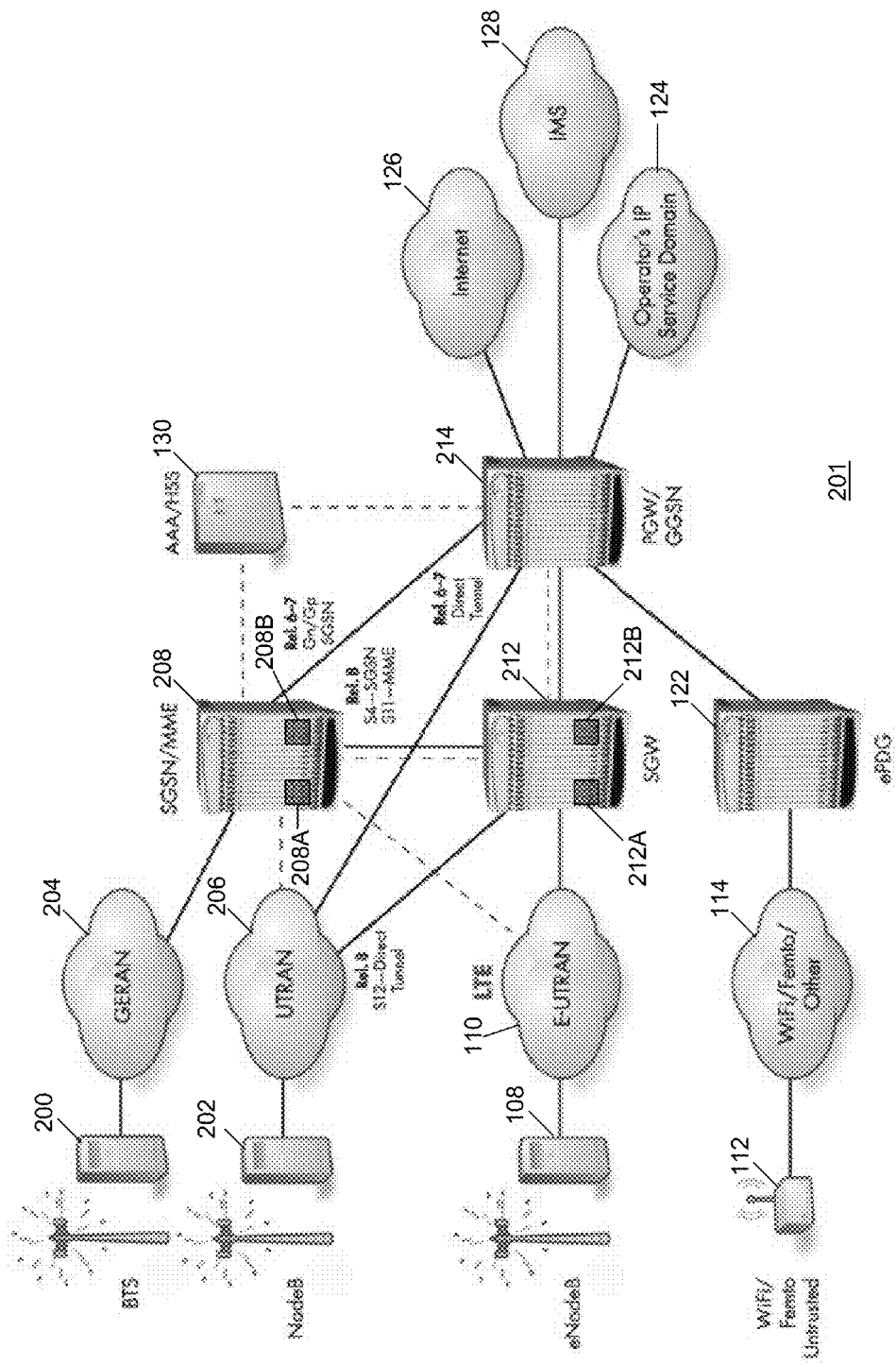

FIG. 2 illustrates a communication network 201 that implements systems, methods, and logic encoded in tangible media for reducing latency and packet loss caused due to handoffs of mobile video traffic with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 having processor(s) 208A and memory 208B with a mobility management entity (MME). The GERAN 204 can communicate through the SGSN functionality on gateway 208 to serving gateway (SGW) 212 having processor(s) 212A and memory 212B or gateway GPRS support node (GGSN)/PGW 214.

In some embodiments, the systems, methods, and logic encoded in tangible media for reducing latency and packet loss caused due to handoffs of mobile video traffic can be implemented on a gateway, such as PDSN/HSGW/SGW 116. The gateway can access and maintain information relating to the communication session, the subscriber, the radio bearers, and the policies relating to the communication session. The gateway may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

Figure 3:
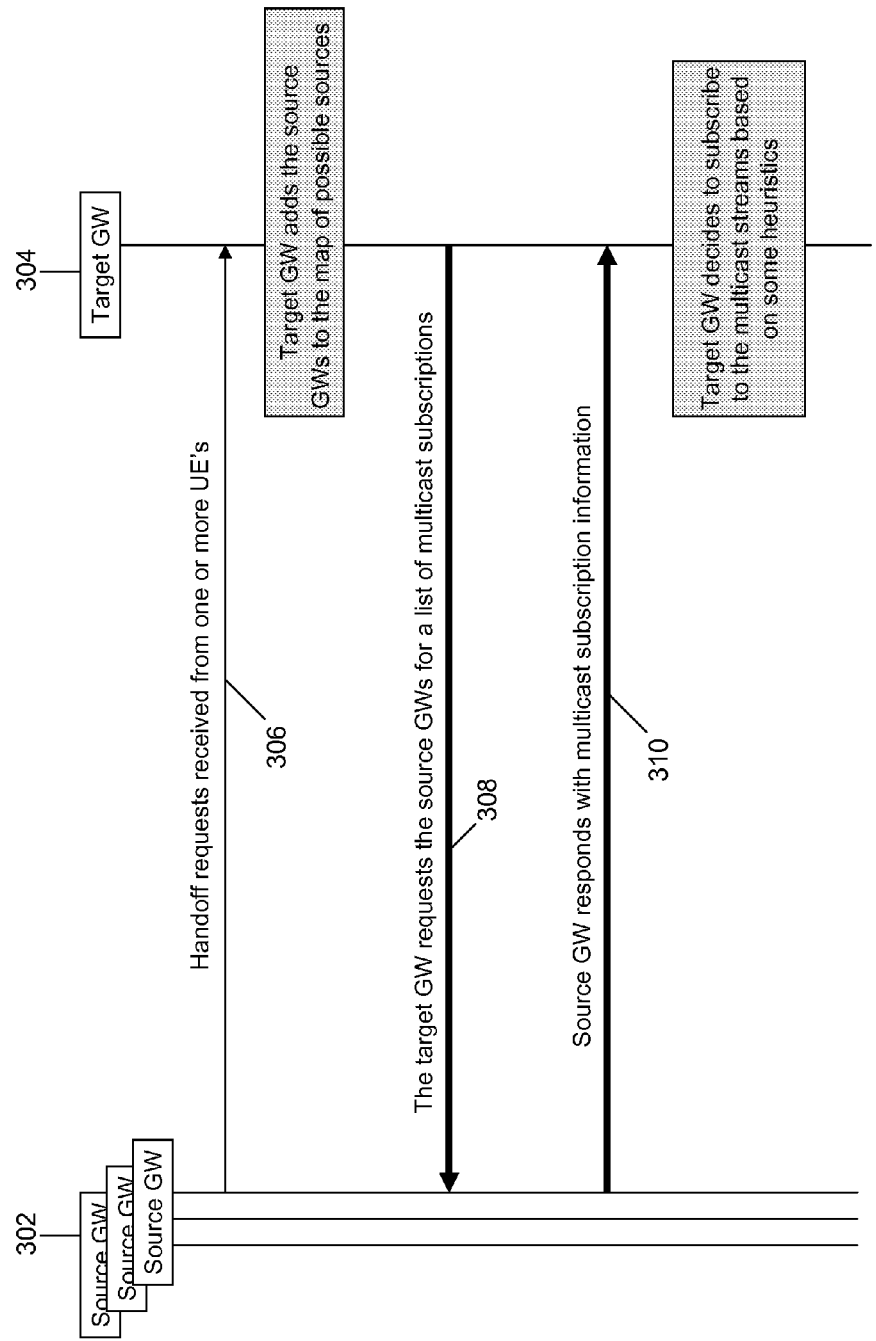
FIG. 3 is a message/signaling flow illustrating the process of learning neighboring servers and preemptively subscribing to multicast video streams in accordance with certain embodiments.

FIG. 3 is a message/signaling flow diagram 300 illustrating how a target gateway learns about neighboring source servers and preemptively subscribes to multicast video streams in accordance with certain embodiments. Referring to FIG. 3, when a user equipment (not shown) is moving away from a source region toward a target region, the user equipment generates a handoff request. A source gateway 302 serving the source region receives the handoff request and sends the handoff request 306 to a target gateway 304. The handoff request 306 includes information about the source gateway 302, such as a geographical location of the source gateway 302.

Upon receiving the handoff request 306, the target gateway 304 updates its handoff source history using the source gateway information. The target gateway 304 uses the handoff source history to learn about the probability of receiving handoff requests from each of the source gateway, including the probability of receiving requests at a specific time of a day and/or a specific day of a week. The target gateway also uses the source gateway information to learn about neighboring source gateways 302. In some embodiments, the target gateway 304 builds and maintains a list, or a map, of neighboring source gateways based on the source gateway information. In some embodiments, the target gateway 304 stores the handoff source history and/or the map of neighboring source gateways in a database.

The target gateway 304 then sends a request 308 to the source gateway 302 for information related to the multicast video streams to which the source gateway 302 subscribes. In response, the source gateway 302 sends the requested subscription information 310, including the number of subscribers, the subscription data rate, the type (e.g., real-time video stream, video on demand, etc.) or format, and the data path information of each subscribed multicast video stream.

Upon receiving the subscription information from the source gateway 302, the target gateway 304 determines whether to subscribe to each multicast video stream based on the subscription information and local heuristics, including available computing and bandwidth resources and processing capacity of the target gateway 304. The target gateway 304 then preemptively subscribes to some or all of the multicast video streams based on the determination. For example, the target gateway 304 can employ one or more multicast stream methods, such as Protocol Independent Multicast (PIM), Internet Group Management Protocol (IGMP), Explicit Multi-Unicast (XCAST), or Grid casting, for preemptively subscribing to the multicast video streams.

Multicasting is a technique for one-to-many communication over a network. Multicasting uses network infrastructure efficiently by requiring a source to send a packet only once, even if the packet needs to be delivered to a large number of receivers. This in turn is made possible by having the nodes in the network take care of replicating the packet only when necessary to reach multiple receivers. Key concepts in IP multicasting, for instance, include an IP multicast group address, a multicast distribution tree, and receiver driven tree creation. IGMP is a protocol used by receivers to join an IP multicast group address, which is used by sources and receivers to send and receive content. PIM is a protocol used to construct a multicast distribution tree. XCAST is an alternate multicast strategy to IP multicast that provides reception addresses of all destinations with each packet. Grid casting is a file and stream sharing system that cooperates transparently by using idle bandwidth on a user's device to deliver large scale live or on-demand broadcasts. It has the advantage of providing a robust live or on-demand streaming solution by splitting up the original high bit-rate stream into smaller bit-rate streams that are shared through user devices and later reconstructing the smaller streams back to the original high bit-rate stream.

In some embodiments, when the target gateway 304 determines that the bandwidth available for the preemptive subscription is not sufficient for the desired multicast video streams, the target gateway 304 subscribes to the desired multicast video streams and processes them to reduce the bandwidth needed for transmitting the video streams. For example, the content of the desired video streams may be trans-rated by the target gateway 304.

In some embodiments, the target gateway 304 caches latest data packets to prevent packet losses during a handoff. By caching, for example, a few seconds' worth of data packets for each multicast video stream, mobile devices receiving the video stream can receive packets that they might have missed during a handoff.

In some embodiments, the target gateway 304 maintains a statically configured subscription to one or more multicast video streams when there are high probability that the video streams would be in demand most of, or all, the time. For example, if a gateway covers an area having a major route or highway that carries high volume of commercial and/or rush hour traffic, it may make sense to maintain a statically configured subscription to video streams that are frequently in demand by such traffics either on daily basis or during weekdays. If the area has a shopping mall or other attractions that are crowded during the weekend, it may make sense to maintain static subscriptions during weekends to cover the likely demands made by people visiting such attractions.

Figure 4:
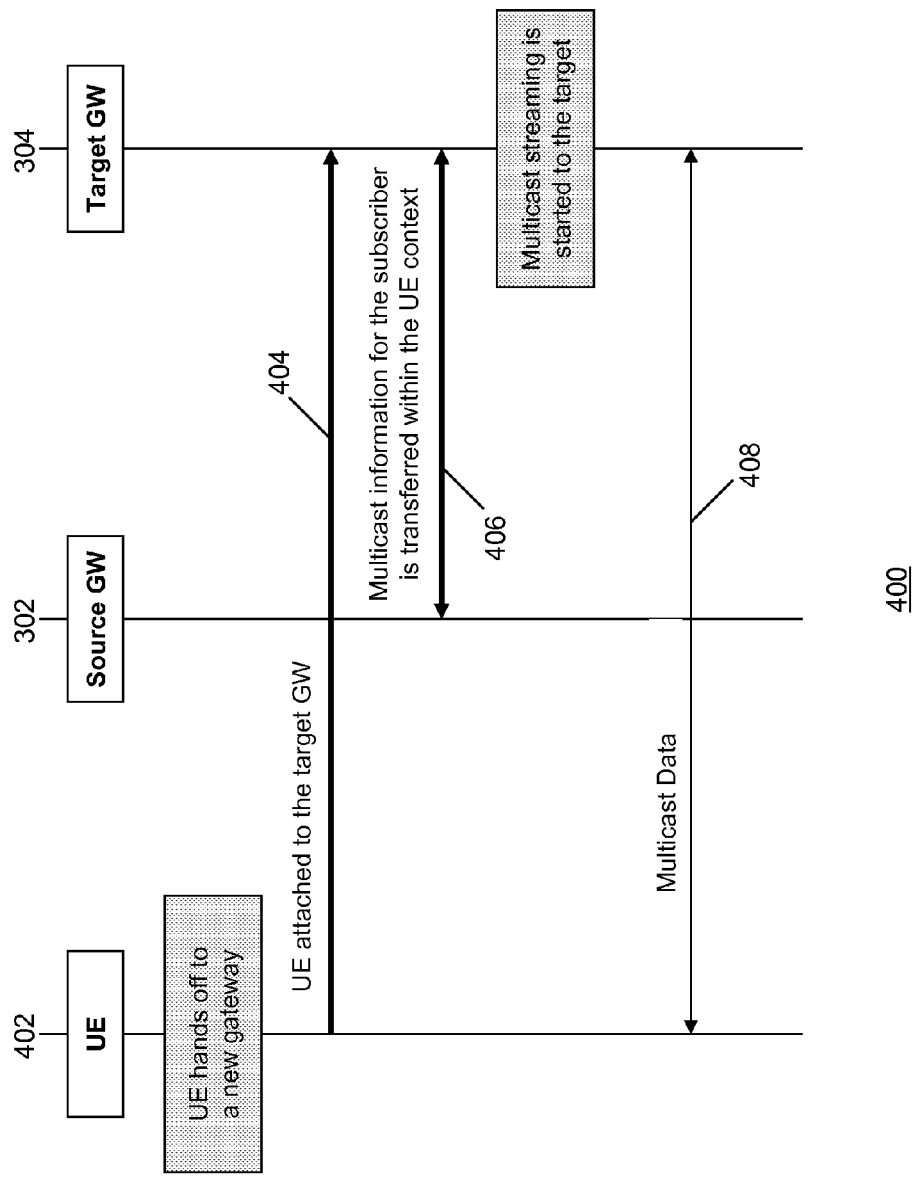
FIG. 4 is a message/signaling flow illustrating the handoff process in accordance with certain embodiments.

FIG. 4 is a message/signaling flow diagram 400 illustrating the handoff process in accordance with certain embodiments. Referring to FIG. 4, the user equipment (UE) 402 that has made the request for a handoff moves into the target region covered by the target gateway 304 and sends a handoff signal 404 to the target gateway 304, thereby the UE 402 attaches to the target gateway 304.

Upon receiving the handoff signal 404 from the UE 402, the target gateway 304 requests and receives context information 406 related to the multicast video streams to which the UE 402 subscribes. Once the context information 406 becomes available, the target gateway 304 starts sending packets related to the subscribed video streams to the UE 402. Because the video streams have been preemptively subscribed by the target gateway 304 prior to the handoff, there is little or no delay due to having to set up the subscription after the handoff. Also, if the video streams are cached by the target gateway 304, the user of the UE 402 would not experience jitter in the video streams even if some packets were lost during the handoff.

In some embodiments, if some of the preemptively subscribed video streams are not demanded by any user equipments within a pre-defined time period, the target gateway 304 releases the video streams. For example, a timer can be attached to each of the preemptively subscribed video streams such that the video streams that are not demanded by user equipments before the corresponding timers expire may be released to conserve the resources of the target gateway 304.

Mobile Subscriber and Gateway

The mobile subscriber described above can communicate with a plurality of radio access networks using a plurality of access technologies and with wired communication networks. The mobile subscriber can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile subscriber may have the capability to run applications or communicate with applications that are provided by servers in the communication network. The user equipment can receive updates and other information from these applications on the network.

The mobile subscriber also encompasses many other devices such as televisions (TVs), video projectors, set-top boxes or set-top units, digital video recorders (DVR), computers, netbooks, laptops, notebooks, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The mobile subscriber can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described herein can implement multiple and different integrated functionalities. In some embodiments, one or more of an access service network gateway (ASNGW), mobility access gateway (MAG), an HRPD serving gateway (HSGW), a mobility management entity (MME), a packet data serving node (PDSN), a foreign agent (FA), a local mobility anchor (LMA), a PDN gateway (P-GW), and a home agent (HA) can be implemented on a gateway. Other types of functionalities that can also be implemented on a gateway in other embodiments are a Gateway General packet radio service Support Node (GGSN), a serving GPRS support node (SGSN), a packet data inter-working function (PDIF), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A gateway can include a PDSN, a FA, a HA, a GGSN, a PDIF, an ASNGW, a UPE, an IP Gateway, an access gateway, or any other applicable access interface device. In certain embodiments, a gateway is provided by Starent Networks, Corp. of Tewksbury, Mass. in a ST16 or a ST40 multimedia platform.

The gateway can also support sessions originated from a Femto base station, which would connect to the gateway through a broadband network. A person or corporation may use a Femto base station in a home or business to support one or more mobile subscribers. The gateway can provide trigger based traffic management during a handoff from a Femto base station to a WiMAX or other macro base station, while maintaining traffic management for the mobile node. In certain embodiments, a gateway device is provided by Starent Networks, Corp. of Tewksbury, Mass. on an ST16 or ST40 multimedia platform.

Figure 5:
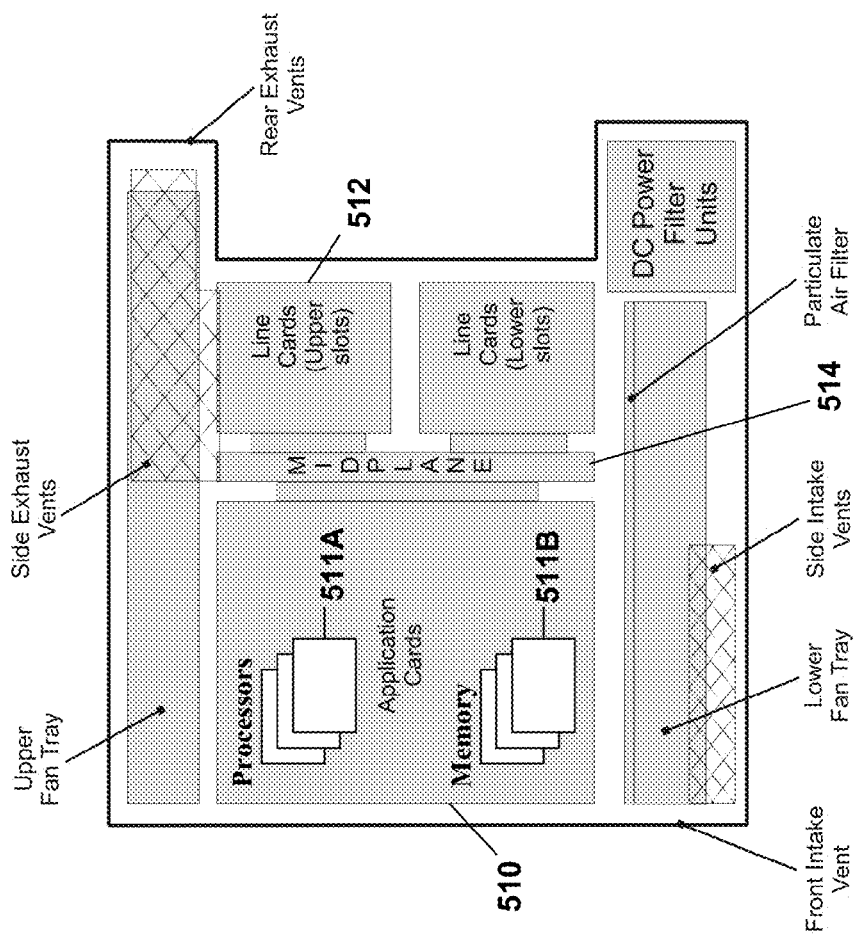
FIG. 5 illustrates components of a gateway in accordance with certain embodiments.

FIG. 5 illustrates a gateway in accordance with certain embodiments. The gateway can include slots for loading application cards 510 including processor(s) 511A and memory 511B and line cards 512. A midplane 514 can be used in the gateway to provide intra-gateway communications, power connections, and transport paths between the various installed cards. The midplane 514 can include buses such as a switch fabric, a control bus, a system management bus, a redundancy bus, and a time division multiplex (TDM) bus. The switch fabric is an IP-based transport path for user data throughout the gateway implemented by establishing inter-card communications between application cards and line cards. The control bus interconnects the control and management processors within the gateway. The gateway management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway supports at least two types of application cards: a switch processor card and a packet accelerator card. The switch processor card serves as a controller of the gateway and is responsible for such things as initializing the gateway and loading software configurations onto other cards in the gateway. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway provide input/output connectivity and can also provide redundancy connections as well.

An ST40 embodiment of the gateway can support a system management card (SMC) and a packet services card (PSC), which are application cards 510. The system management card is a system control and management card for managing and controlling other cards in the gateway. The packet services card is a high-speed processing card that provides multi-threaded point-to-point, packet data processing, and context processing capabilities, among other things.

The operating system software can be based on a Linux software kernel and run specific applications in the gateway such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a MAG, LMA, HSGW, P-GW, MME, PDSN, ASNGW, PDIF, HA, GGSN, or IPSG).

The gateway's software can be divided into a series of tasks that perform specific functions. These tasks communicate with each other as needed to share control and data information throughout the gateway. A task is a software process that performs a specific function related to system control or session processing. Three types of tasks operate within the gateway in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway by monitoring the various software and hardware components of the gateway. Recovery control task subsystem is responsible for executing a recovery action for failures that occur in the gateway and receives recovery actions from the high availability task subsystem. Shared configuration task subsystem provides the gateway with an ability to set, retrieve, and receive notification of gateway configuration parameter changes and is responsible for storing configuration data for the applications running within the gateway. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

In some embodiments, the software needed for implementing a process or a database includes a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present disclosure has been described and illustrated in the foregoing exemplary embodiments, it is understood that the present disclosure has been made only by way of example, and that numerous changes in the details of implementation of the disclosure may be made without departing from the spirit and scope of the disclosure, which is limited only by the claims which follow.

What is claimed is:

1. A system, comprising:
a memory for storing data; and
a processor configured for using the data such that the system can:
request from a source gateway subscription information related to a plurality of multicast video streams subscribed by the source gateway upon receiving a handoff request from a mobile device transitioning from a source region to a target region; and
subscribe to at least a subset of the plurality of multicast video streams before the requested handoff is complete,
wherein the handoff request contains information related to the source gateway.

2. The system of claim 1, wherein the processor is further configured for using the data such that the system can maintain a handoff source history based on the source gateway information contained in the handoff request.

3. The system of claim 2, wherein the processor is further configured for using the data such that the system can maintain a static subscription to one or more of the plurality of multicast video streams based on the handoff source history.

4. The system of claim 2, wherein the processor is further configured for using the data such that the system can predict a probability of receiving a handoff request from a mobile device in the source region based on the handoff source history.

5. The system of claim 4, wherein the processor is further configured for using the data such that the system can predict the probability at one or more of:
- a specific time of a day;
- a specific day of a week; or
- a specific date of a month.

6. The system of claim 1, wherein the processor is further configured for using the data such that the system can build a list of neighboring source gateways based on source gateway information contained in handoff requests received from the neighboring source gateways.

7. The system of claim 1, wherein the processor is further configured for using the data such that the system can determine to subscribe to the at least a subset of the plurality of multicast video streams based on the subscription information received from the source gateway.

8. The system of claim 7, wherein the subscription information comprises:
- a number of subscribed multicast video streams;
- a number of subscribers for each video stream;
- a subscription data rate of each video stream;
- a type of each video stream; and
- data path information of each video stream.

9. The system of claim 1, wherein the processor is further configured for using the data such that the system can cache the at least a subset of the plurality of multicast video streams.

10. The system of claim 1, wherein the processor is further configured for using the data such that the system can determine whether one or more of the plurality of multicast video streams are already subscribed.

11. A method for mobile communication, comprising:
- receiving a handoff request containing information related to a source gateway from a mobile device transitioning from a source region to a target region;
- requesting from the source gateway subscription information related to a plurality of multicast video streams subscribed by the source gateway; and
- subscribing to at least a subset of the plurality of multicast video streams before the requested handoff is complete.

12. The method of claim 11, further comprising maintaining a handoff source history based on the source server information contained in the handoff request.

13. The method of claim 12, further comprising establishing a static subscription to one or more of the plurality of multicast video streams based on the handoff source history.

14. The method of claim 12, further comprising predicting a probability of receiving a handoff request from a mobile device in the source region based on the handoff source history.

15. The method of claim 14, further comprising predicting the probability at one or more of:
- a specific time of a day;
- a specific day of a week; or
- a specific date of a month.

16. The method of claim 11, further comprising building a list of neighboring source gateways based on source gateway information contained in handoff requests received from the neighboring source gateways.

17. The method of claim 11, further comprising determining to subscribe to the at least a subset of the plurality of multicast video streams based on the subscription information received from the source gateway.

18. The method of claim 17, wherein the subscription information comprises:
- a number of subscribed multicast video streams;
- a number of subscribers for each video stream;
- a subscription data rate of each video stream;
- a type of each video stream; and
- data path information of each video stream.

19. The method of claim 11, further comprising caching the at least a subset of the plurality of multicast video streams.

20. A non-transitory computer readable medium encoded code for execution and when executed by a processor is operable to perform operations comprising:
- receiving a handoff request containing information related to a source gateway from a mobile device transitioning from a source region to a target region;
- requesting from the source gateway subscription information related to a plurality of multicast video streams subscribed by the source gateway; and
- subscribing to at least a subset of the plurality of multicast video streams before the requested handoff is complete.

* * * * *